United States Patent [19]

DeKarske et al.

[11] Patent Number: 4,560,939

[45] Date of Patent: Dec. 24, 1985

[54] SYNCHRONIZED SELECTABLE RATE CLOCKING SYSTEM

[75] Inventors: Clarence W. DeKarske; Thomas M. Wilcoski, both of St. Paul, Minn.

[73] Assignee: Sperry Corporation, New York, N.Y.

[21] Appl. No.: 595,885

[22] Filed: Apr. 2, 1984

[51] Int. Cl.[4] .......................... H04J 3/06; H03L 7/00
[52] U.S. Cl. ...................................... 328/72; 328/55; 328/155; 375/117
[58] Field of Search .................... 328/72, 75, 152, 63, 328/55, 155; 375/117

[56] References Cited

U.S. PATENT DOCUMENTS

| | | | |
|---|---|---|---|
| 3,787,749 | 1/1974 | Uchida et al. | 328/72 |
| 3,938,144 | 2/1976 | Pederson et al. | 375/117 |
| 4,017,683 | 4/1977 | Pederson et al. | 375/117 |
| 4,419,629 | 12/1983 | O'Brien | 328/72 |
| 4,475,085 | 10/1984 | Yahata et al. | 328/155 |

Primary Examiner—John S. Heyman
Attorney, Agent, or Firm—Griffin, Branigan & Butler

[57] ABSTRACT

A data processing system is provided with multiple system clock sources operating at different frequencies for selectively and synchronously driving a plurality of clock pulse generators. The clock pulse generators include four-stage ring counters which may be controlled to produce either four or eight phase clocking signals. When a change is to be made from one system clock source to another, the clock pulse generators are stopped. A phase capture register stores an indication of the last phase generated. While the clock pulse generators are stopped, the change over to the new system clock source is made. The clock pulse generators are restarted at a first time or a second, later time depending upon whether the stored phase indication indicates that the clock pulse generators were stopped at one of phases 5-8 or one of phases 1-4.

4 Claims, 12 Drawing Figures

FIG. 9b

SYNCHRONIZED SELECTABLE RATE CLOCKING SYSTEM

BACKGROUND OF THE INVENTION

The present invention relates to a synchronized clocking system wherein the basic clock frequency is selectable and the switch-over between the basic clock frequencies is accomplished without loss of synchronism between the various clocking units.

The present invention relates to an improvement in clocking systems such as that used in the Sperry Corporation 1100/90 data processing system. Such systems may include input/output processors and storage units operating on a four-phase 60 ns clock and instruction processors, scientific processors and high performance storage units operating on an eight-phase 60 ns clock. Each unit, i.e. processor or storage unit has an associated clock distribution module or modules for distributing clocking pulses to the logic circuits within the unit. The clock distribution modules are driven from a system master clock pulse source and each clock distribution module includes a plurality of clock pulse generators for generating the different phase pulses which are required for clocking the logic circuits of its associated processor or memory unit.

For purposes of uniformity of implementation the clock pulse generators are identical integrated circuits which are programmable to produce either four or eight phase clock signals. The clock pulse generators each include a four stage ring counter and an indicator. Generally speaking, the ring counter is stepped by the system clock pulses and the resulting output signals are gated to different clock phase output terminals of the clock pulse generator. Assuming that a clock pulse generator is programmed to produce four-phase clocking signals, the four output signals of the ring counter are applied to four sets of output terminals so that a clock pulse of a given phase appears at a given set of output terminals once for every fourth system clock pulse. If a clock pulse generator is programmed to produce eight-phase clocking signals then the four output signals of the ring counter are applied to eight output terminals. On one cycle of the ring counter its output signals are applied to four sets of output terminals of the clock pulse generator and on the next cycle its output signals are applied to four different sets of clock pulse generator output terminals. Thus, in a clock pulse generator producing an eight-phase clock, the first stage of the ring counter produces the phase 1 and 5 pulses, the second stage produces the phase 2 and 6 pulses, the third stage produces the phase 3 and 7 pulses, and the fourth stage produces the phase 4 and 8 pulses.

For maintenance purposes it may sometimes be necessary to operate the clock pulse generators of a given clock distribution module at a rate different from the normal frequency. For example, if an intermittent problem should develop the maintenance engineer may wish to operate the clock pulse generators of a given clock distribution module at a higher frequency so that the malfunction will occur more frequently, or permanently, if the problem is a marginal timing problem. On the other hand, the maintenance engineer may wish to operate the clock pulse generators at a lower frequency. If the problem persists at the lower frequency then the problem is not one of marginal timing but is instead probably a logic malfunction in the unit driven by the clock distribution module.

It is necessary that synchronization be maintained when the maintenance engineer switches between system clock frequencies. It is essential that the changeover be detected as soon as possible, the clock pulse generators stopped, cleared and then restarted so that they output the next phase following the one they were in at the time they were stopped.

The problem of selecting the restart phase is rendered more difficult since the clock pulse generators are capable of producing either four or eight phase outputs from a single four-stage counter and must align with the system clock. Thus, on restart it is necessary to know if the first phase pulse to be issued is to be, for example, a phase 1 or a phase 5 pulse if programmed as an 8-phase generator.

SUMMARY OF THE INVENTION

An object of the present invention is to provide a system clock unit for producing system clock signals at a plurality of different frequencies, a selector for selecting the system clock signals of one of the frequencies, a plurality of clock pulse generators, and a clock control circuit for controlling the selector to select one of the system clock frequencies, the clock control circuit controlling the clock pulse generators so that the first phase pulse issued by a clock pulse generator after a change in frequencies is of the next phase following the last phase pulse issued by the clock pulse generator before the change in frequencies.

An object of the present invention is to provide a clock distribution system as described above wherein the clock pulse generators are programmable to generate clocking signals of n phases or m phases, n and m being different integers.

An object of the present invention is to provide a clock distribution system as described above wherein the selected system clock signals drive the clock pulse generators and a signal representing a system clock frequency change initiates operation of the clock control circuit to stop the clock pulse generators, capture the phase at which they were stopped, and selectively restart the clock pulse generators at the new frequency and enable their outputs so that the first phase generated is the next phase following the last phase generated before the frequency change and still maintain synchronization with the system clock.

Other objects of the invention and its mode of operation will become apparent upon consideration of the following description and the accompanying drawings.

DETAILED DESCRIPTION OF THE INVENTION THE CLOCK SYSTEM

Figure 1:
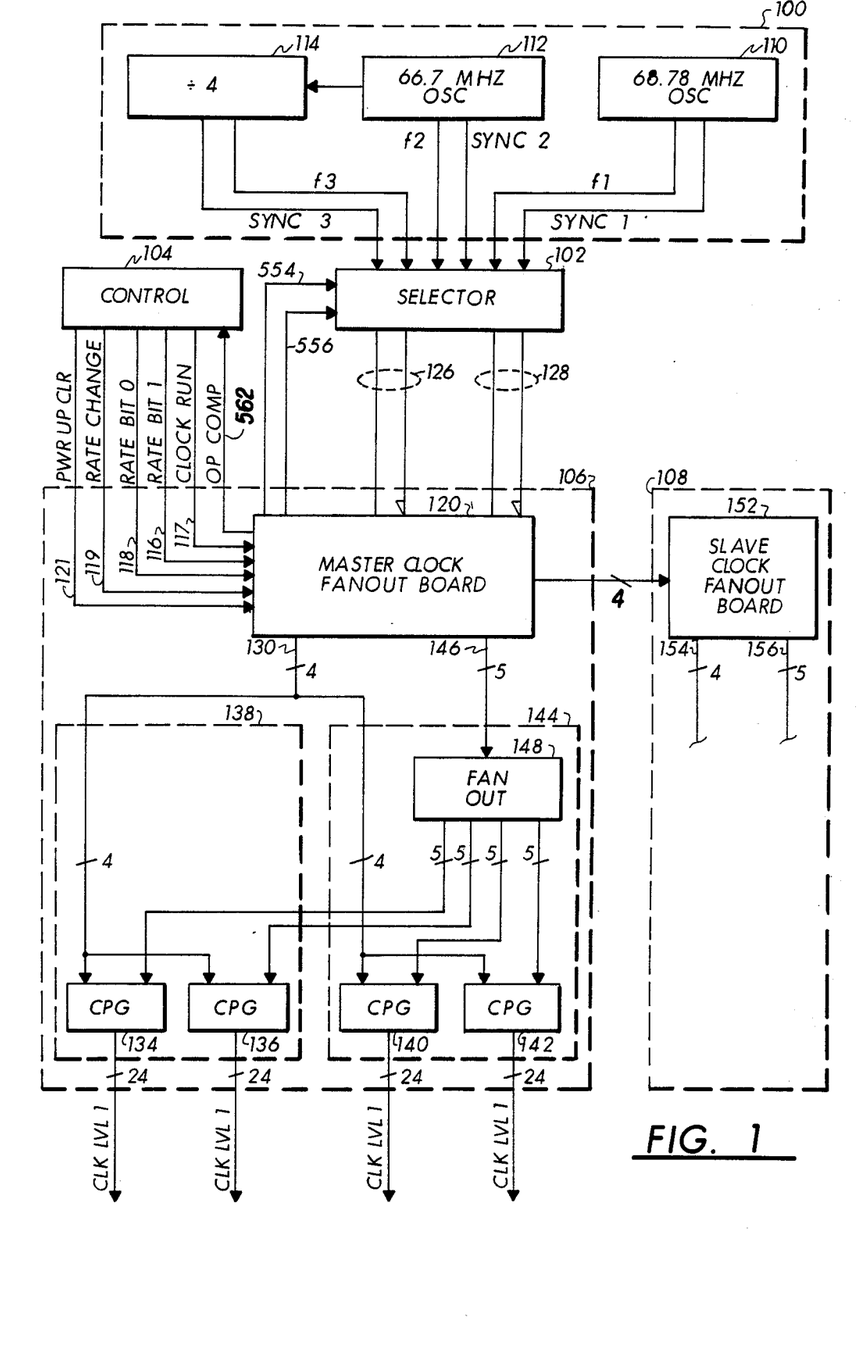
FIG. 1 is a block diagram of a clock distribution system.

As illustrated in FIG. 1, a preferred embodiment of the invention comprises a master oscillator unit 100, a selector 102, a control means 104 and a unit clock distribution and control means comprising two modules 106 and 108.

Figures 5, 8:
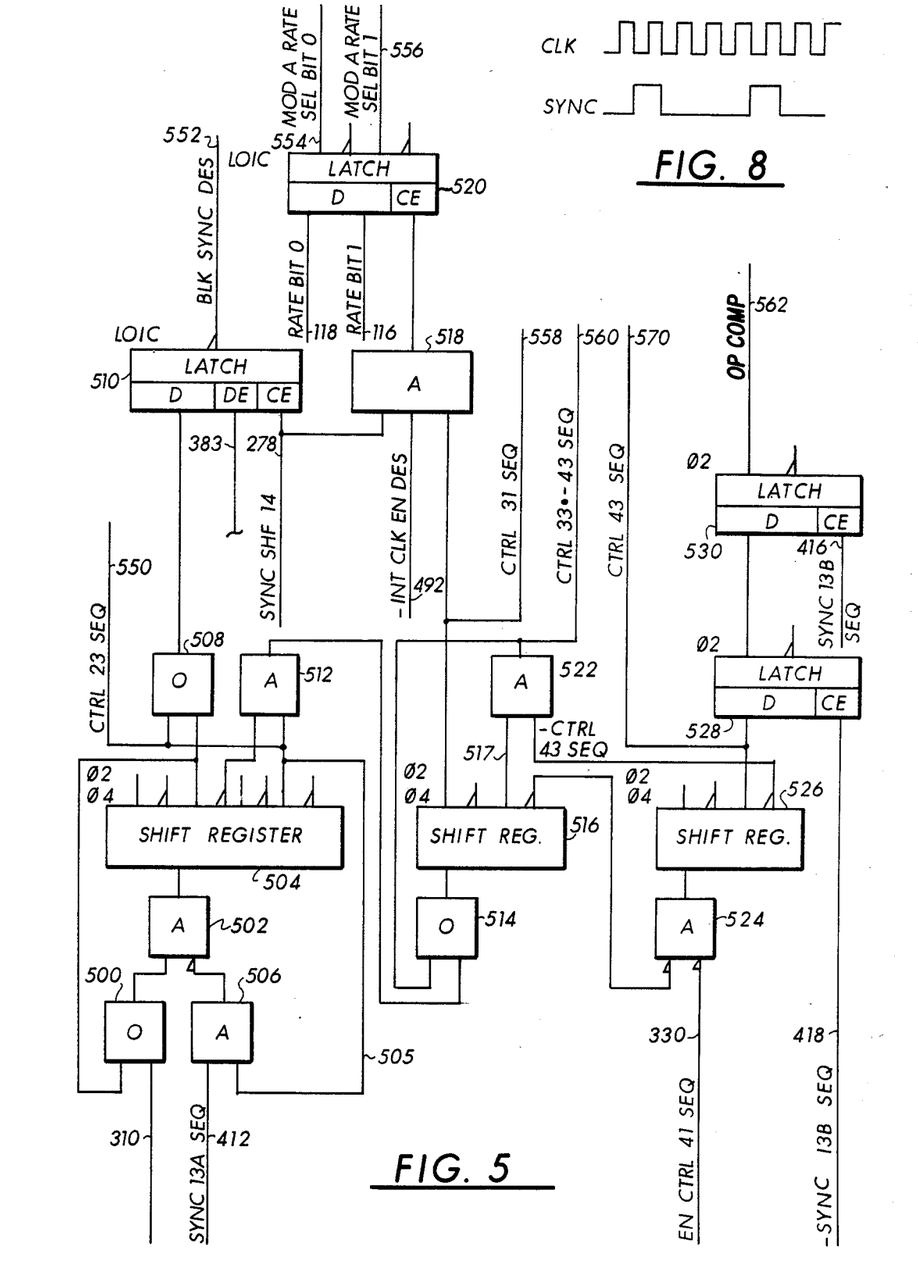
FIG. 8 is a waveform diagram illustrating the relationship between system clock pulses and system sync pulses.

The oscillator unit 100 comprises a fast oscillator and logic circuit 110, a normal oscillator and logic circuit 112 and a divide by four counter and logic circuit 114 which is driven by circuit 112. Fast oscillator 110 produces a sequence of clock pulses $f_1$ and drives a logic circuit that produces a sequence of sync signals Sync 1 which are applied to inputs of selector 102. The normal oscillator 112 produces a sequence of clock signals $f_2$ and drives a logic circuit that produces a sequence of sync signals Sync 2 which are applied to selector 102. The output of oscillator 112 is also applied to the counter and logic circuit 114 so that it produces a "slow oscillator" output comprising a sequence of clock pulses $f_3$ and a sequence of sync signals Sync 3 which are applied to the selector 102. FIG. 8 illustrates the timing relationships between the clock signals $f_1$, $f_2$ and $f_3$ and the Sync 1, Sync 2 and Sync 3 signals, respectively.

Normally, the output of normal oscillator 112 is selected by selector 102 and passed on to the clock distribution and control module 106. However, for maintenance purposes it may be desirable to test the operation of a single isolated unit (for example an instruction processor, scientific processor or input/output processor) or a group of units by applying to the unit or units in the application clock signals which are of a higher or lower frequency than normal. The selection of the frequency which is applied to the unit is controlled from the control module 104. Although not illustrated in the drawing, the control module 104 is adapted to receive an input which may be keyed into the system from a keyboard. Thus, the maintenance engineer may key in a value corresponding to the frequency he wishes to select and a code which specifies an operation such as rate change, clock run, etc. When the control module 104 receives the rate select code and the rate value it produces a combination of output signals on leads 116, 118 and 119 which are connected to a master clock fan-out board 120 within the module 106. As subsequently explained, circuits within the fan-out board 120 respond to the control signals from control module 104 and control the timing at which the rate select bits on leads 116 and 118 are applied to selector 120 over leads 554 and 556.

The selector 102 responds to the signals on leads 122 and 124 by selecting one of the frequencies from the oscillator unit 100 and the sync signal associated with that frequency. The selected oscillator frequency appears at the output of selector 102 as the system clock signal on a pair of differential leads 126 while the selected sync signal appears at the output of selector 102 as the system sync signal on a pair of differential leads 128.

The fan-out board 120 responds to the system clock and the system sync signals and produces two differential signals designated Level 0 Clock and Level 0 Delayed Clock which are applied over leads 130 to two clock pulse generators 134 and 136 located on a primary printed circuit card 138 and to two further clock pulse generators 140 and 142 located on a secondary printed circuit card 144.

The fan-out board 120 also produces certain control signals on leads 146 which are applied through a fan-out circuit 148 on the secondary card 144 to the clock pulse generators 134, 136, 140 and 142. As subsequently explained, the clock pulse generators may be individually controlled to produce either a four phase or an eight phase clock output signal and may be further controlled as to the mix of the different phase signals produced. For example, a clock pulse generator may be controlled to produce only phases 1, 2 and 4 of a four phase clock with each of the phases produced appearing at more than 1 of the 24 outputs which are collectively referred to as Clock Level 1.

Although not shown in FIG. 1, the module 106 may include 26 secondary cards like secondary card 144 and 25 primary cards like primary card 138. The additional cards are driven by signals on the output leads 130 and 146 from the fan-out board. A 26th primary card is included within the fan-out board 120.

Because of clock drive requirements it may sometimes be necessary to provide more clock signal sources than are available from the clock pulse generators in master module 106. Thus, a slave module 108, similar to the module 106, may be provided. The system clock and system sync signals on leads 126 and 128 pass through the fan-out board 120 and are applied as two differential signals over leads 250 to a slave clock fan-out board 152 within the module 108. The fan-out board 152 produces output signals on leads 154 and 156 to control further clock pulse generators in the same manner as the fan-out board 120. Since module 108 is similar to module 106 the output connections are not shown in FIG. 1.

It should be understood that the selector 102 and modules 106 and 108 represent the clock control for only one unit. Thus, in a data processing system having plural instruction processors, scientific processors, memory modules, etc. there is a selector 102, a master module 106 and possibly a slave module 108 for each unit. The signals from the master oscillator unit 100 are fed in parallel to each selector and the output signals from the master and slave modules 106 and 108 provide the clocking signals for the processor in which the modules are located.

CLOCK PULSE GENERATORS

Figure 7:
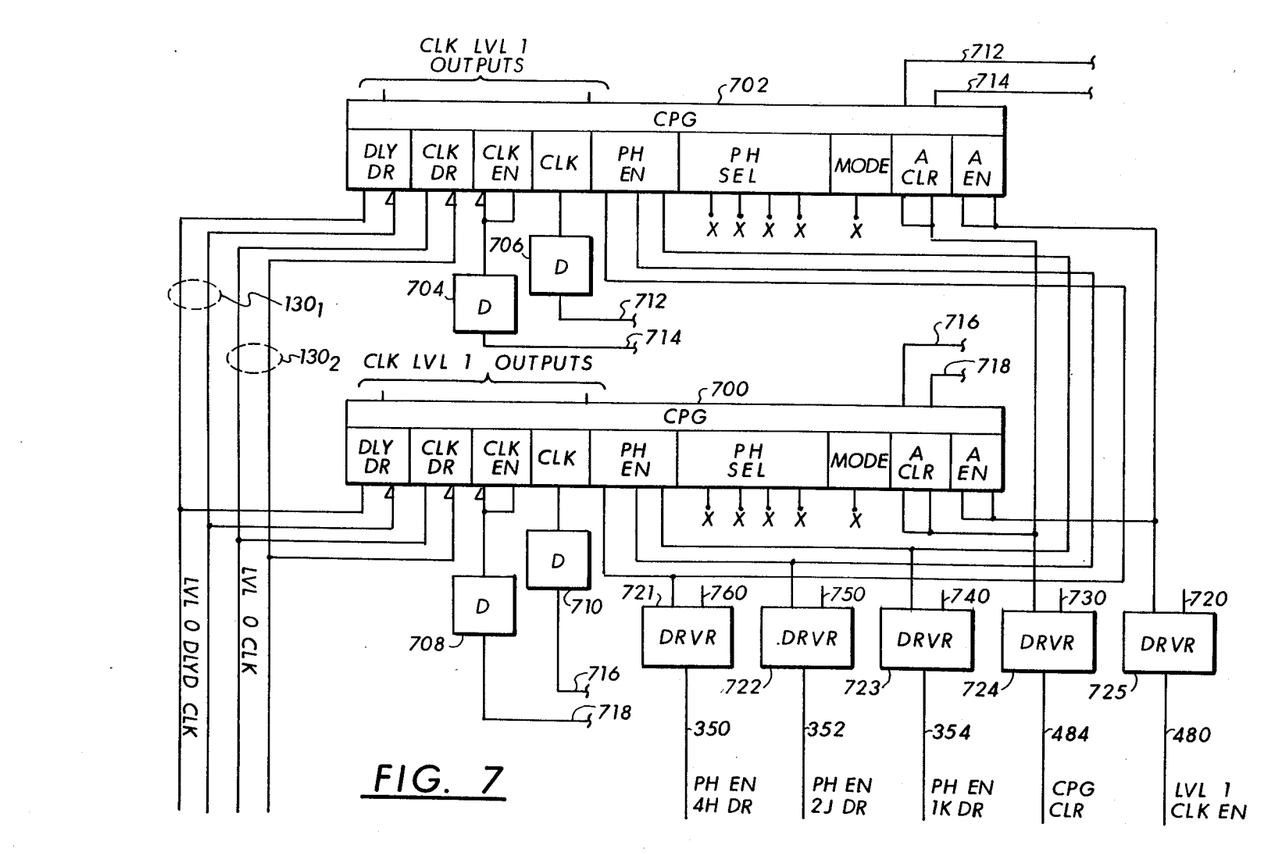
FIG. 7 illustrates typical clock pulse generators controlled by the control logic circuits of FIGS. 2-5 to produce multiphased clocking signals for clocking a processor or storage unit.

FIG. 7 illustrates the circuits contained on one secondary card such as the secondary card 144 shown in FIG. 1. The card includes two clock pulse generators 700 and 702, four delay elements 704, 706, 708, and 710, and a plurality of drivers 721–725. The clock pulse generators 700 and 702 are elements well known in the art and each includes a 4-bit shift register counter which, when enabled, repetitively generates four output signals which are applied to gating circuits within the clock pulse generators. Considering clock pulse generator (CPG) 700, a CPG has a Mode input which is tied to a high level voltage if the CPG is to output eight different clock phase signals and is tied to a low voltage if the CPG is to output four different clock phase signals. The Mode input of CPG 700 is shown as tied to a voltage X which may be either high or low depending upon what phase signals are required from the CPG in order to clock a given unit.

The CPG 700 has 24 output terminals at which the phased signals Clock Level 1 appear. The CPG 700 has four Phase Select inputs in order to select a particular mix of phase signals at these 24 outputs. For example, if the Mode input of the CPG is tied high so that it generates an eight phase clock, all four of the Phase Select inputs may be tied low in which case phase 1 signals are produced at three of the output terminals, phase 2 at another three and so forth through phase 8. On the other hand, if all of the Phase Select inputs except the left-most one shown in FIG. 7 are tied high, then phase 1, phase 5 and phase 7 signals are each produced at six of the output terminals and phase 4 and phase 5 signals are each produced at three of the output terminals.

The clocking output signals from the CPG 700 may also be controlled by three Phase Enable inputs which are derived from drivers 721-723. The Phase Enable inputs control output gating in the CPG to select none, any one, or all phases for issue from the CPG.

The Level 0 Clock signal on leads $130_2$ is applied to differential receiver (not shown) in the CPG and the receiver produces a buffered clock drive signal on lead 716 which is applied through a delay element 710 to the Clock input of the CPG. If the ring counter in the CPG is enabled, it will step one time in response to each Level 0 Clock signal transition, i.e. on the leading and trailing edges of the signals.

The Level 0 Delayed Clock signals on leads $130_1$ are applied to a second differential receiver in the CPG and the receiver produces an output signal on lead 718 which is passed through a delay element 708 to the Clock Enable inputs of the CPG. When the Clock Enable inputs are high they enable the output gating from the CPG.

The ring counter in the CPG can be advanced by signals applied to the Clock input only if the A Enable input of the CPG is high. The A Enable input is connected to the output of driver 725 so that the ring counter in the CPG is enabled to count as long as the Level 1 Clock Enable signal is present on lead 480.

The ring counter and all latches in the CPG are cleared when the signal CPG Clear appears on lead 484. This signal passes through driver 724 and is applied to the A Clear input of the CPG.

The second CPG 702 on the secondary board is identical to the CPG 700. The outputs of drivers 721-725 are connected in parallel to the Phase Enable, A Clear, and A Enable inputs of the two CPGs.

The drivers 721-725 are shown as having additional output leads 720, 730, 740, 750 and 760. These leads are connected to the CPGs on a primary card. With the exception of the drivers 721-725, each primary card includes two CPGs like those shown in FIG. 7. On all of the primary cards except one, the connections to the inputs of the CPGs are as shown in FIG. 7. The one exception is the primary card which is used to control the logic circuits on the master clock fan-out board 120.

Figure 3:
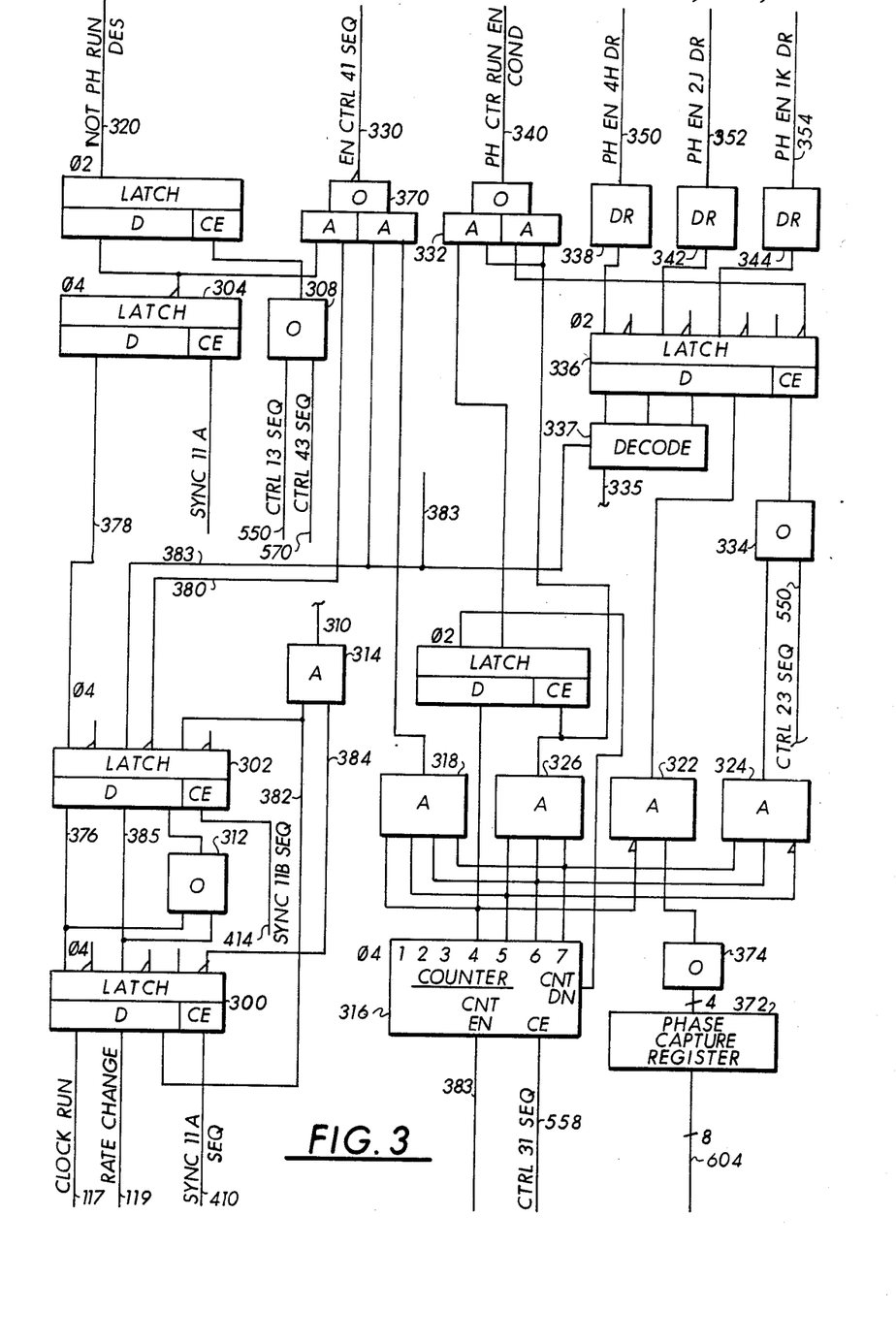
Figure 6:
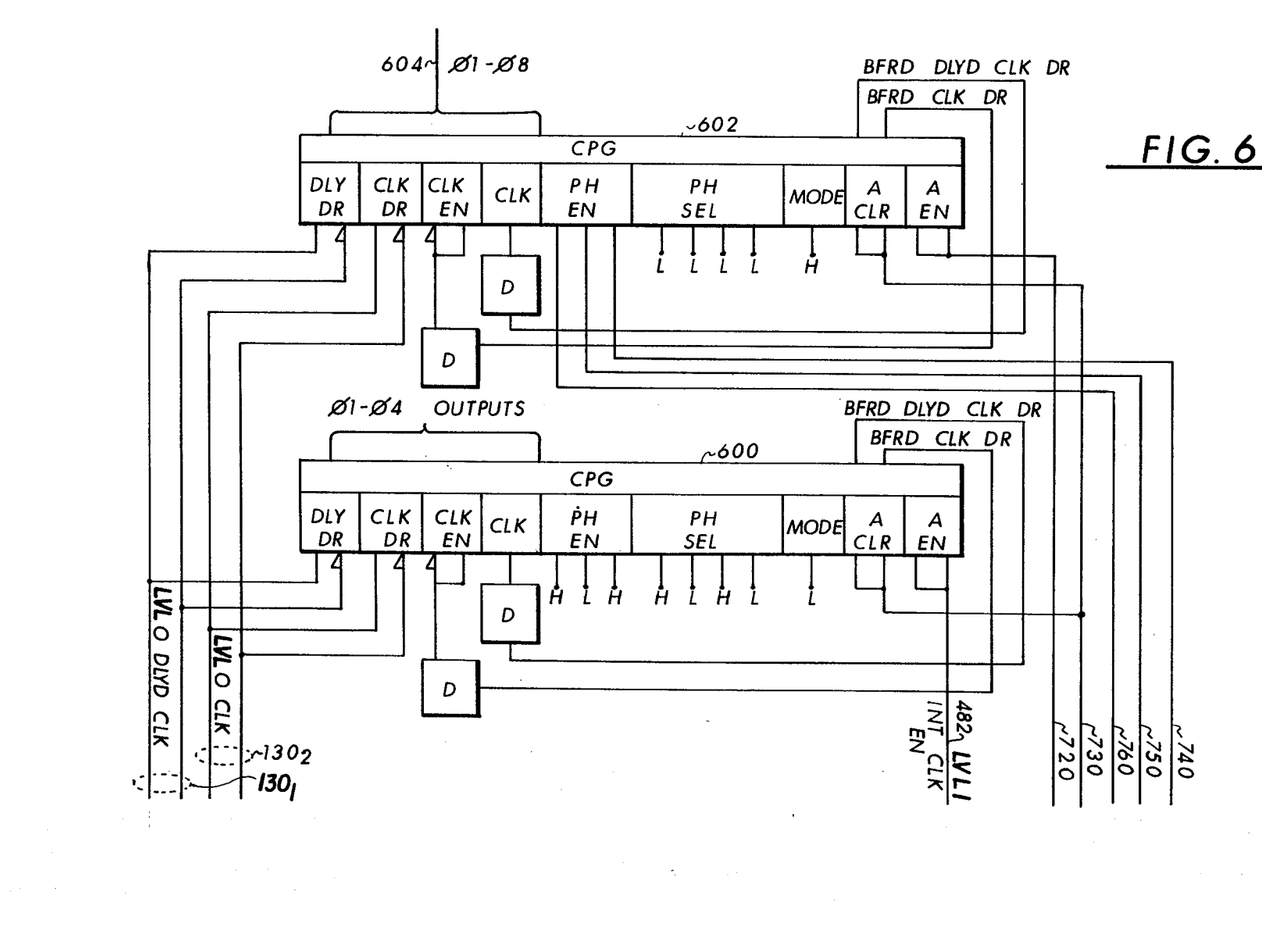
FIG. 6 shows two clock pulse generators utilized in conjunction with the control logic circuits of FIGS. 2-5 to control a rate change operation.

FIG. 6 shows the primary card which contains two CPGs 600 and 602 for clocking the logic circuits on the fan-out board. CPG 602 has its A Enable, A Clear and Phase Enable inputs connected to the outputs of drivers 721-725 in the same manner as the CPGs on the secondary cards. However, the Mode input is tied high while all of the Phase Select inputs are tied low. The high Mode select input causes the CPG 602 to generate clocking signals of eight phases and the Phase Select inputs (all low) are such that each of the eight different phases appears at three different output terminals. Eight of these terminals are connected by leads 604 to a phase capture register 372 (FIG. 3).

The CPG 600 provides the primary clocking pulses for the logic circuits of the clock fan-out board 120. The A Clear input is connected by lead 730 to the output of driver 724 on a secondary board. The A Enable input is connected to receive the signal Level 1 Internal Clock Enable over lead 482. The Mode input is tied low so that the CPG 600 produces fourphase clock signals. The phase inputs are tied HLHL so that phase 1 and phase 3 signals are each produced at three output terminals and phase 2 and phase 4 signals are each produced at nine output terminals of the CPG. The Phase Enable inputs are tied HLH which insures that the output gating for all four phases is enabled. The CPG 600 repetitively outputs clocking signals of phases 1 through 4 as long as the signal on lead 482 is true and the Level 0 Clock and Level 0 Delayed Clock pulses are received over leads $130_1$ and $130_2$.

RATE CHANGE LOGIC - NORMAL RUNNING

FIGS. 2-5 illustrate the logic circuits contained within the master clock fan-out board 120 for changing the rate at which Clock Level 1 signals are produced at the outputs from module 106. However, before describing the rate change logic, the condition of the circuits during normal operation prior to a rate change request will be described.

Figure 2:
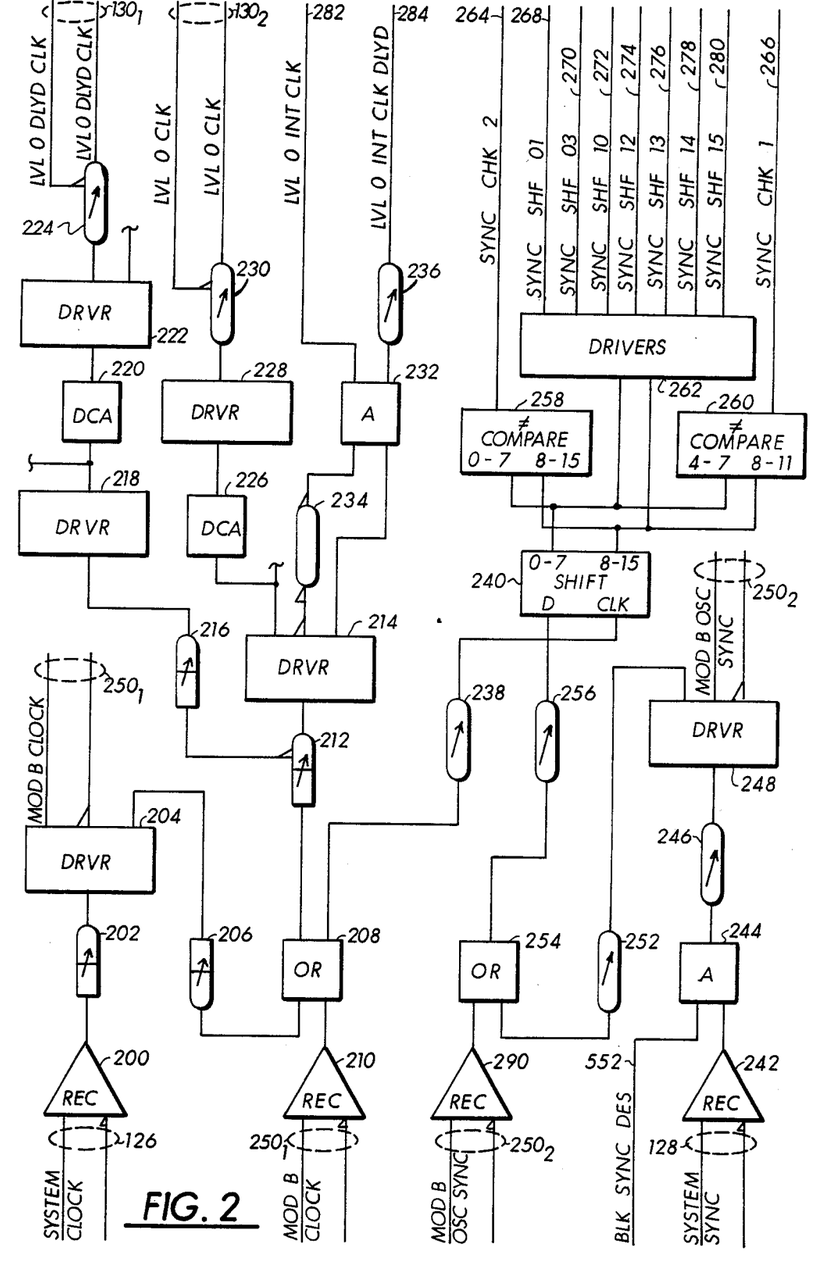
FIGS. 2-5 show the control logic circuits contained on a master card clock fan-out board.

In FIG. 2, the selected system clock signal from selector 102 is applied through a receiver 200 to an adjustable delay and duty cycle circuit 202. The circuit 202 includes an adjustable delay followed by a circuit for adjusting the clock duty cycle. The output of circuit 202 is applied to a driver 204.

The output of driver 204 is applied through an adjustable delay and duty cycle circuit 206 to one input of an OR 208. The output of OR 208 is applied to an adjustable delay and duty cycle circuit 212 which drives a driver 214 and an adjustable delay and duty cycle circuit 216. The output of circuit 216 is connected to a driver 218. The driver 218 produces output signals which are applied to a plurality of duty cycle adjust circuits 220 each of which drives a driver 222. For purposes of clarity, only one duty cycle adjust circuit 220 and one driver 222 are shown in FIG. 2. Each driver 222 drives a pluarlity of adjustable delay circuits 224, only one of which is shown in FIG. 2. The delay circuits 224 produce the differential signals Level 0 Delayed Clock on leads $130_1$. These signals are distributed to the CPGs illustrated in FIGS. 6 and 7.

The output of driver 214 is connected in parallel to a plurality of duty cycle adjust circuits 226 one of which is shown in FIG. 2. Each duty cycle adjust circuit 226 has an output connected to a driver 228 with the outputs of each driver being connected to a plurality of adjustable delay circuits 230. The delay circuits 230 produce the differential signals Level 0 Clock on leads $130_2$ and these signals are distributed to the CPGs shown in FIG. 6 and 7.

The output of driver 214 is applied directly to one input of an AND 232 and through a fixed delay 234 to a second input of the AND. AND 232 produces the signal Level 0 Internal Clock on lead 282 and also produces an output which passes through a fixed delay 236 to become the signal Level 0 Internal Clock Delayed on lead 284.

Figure 4:
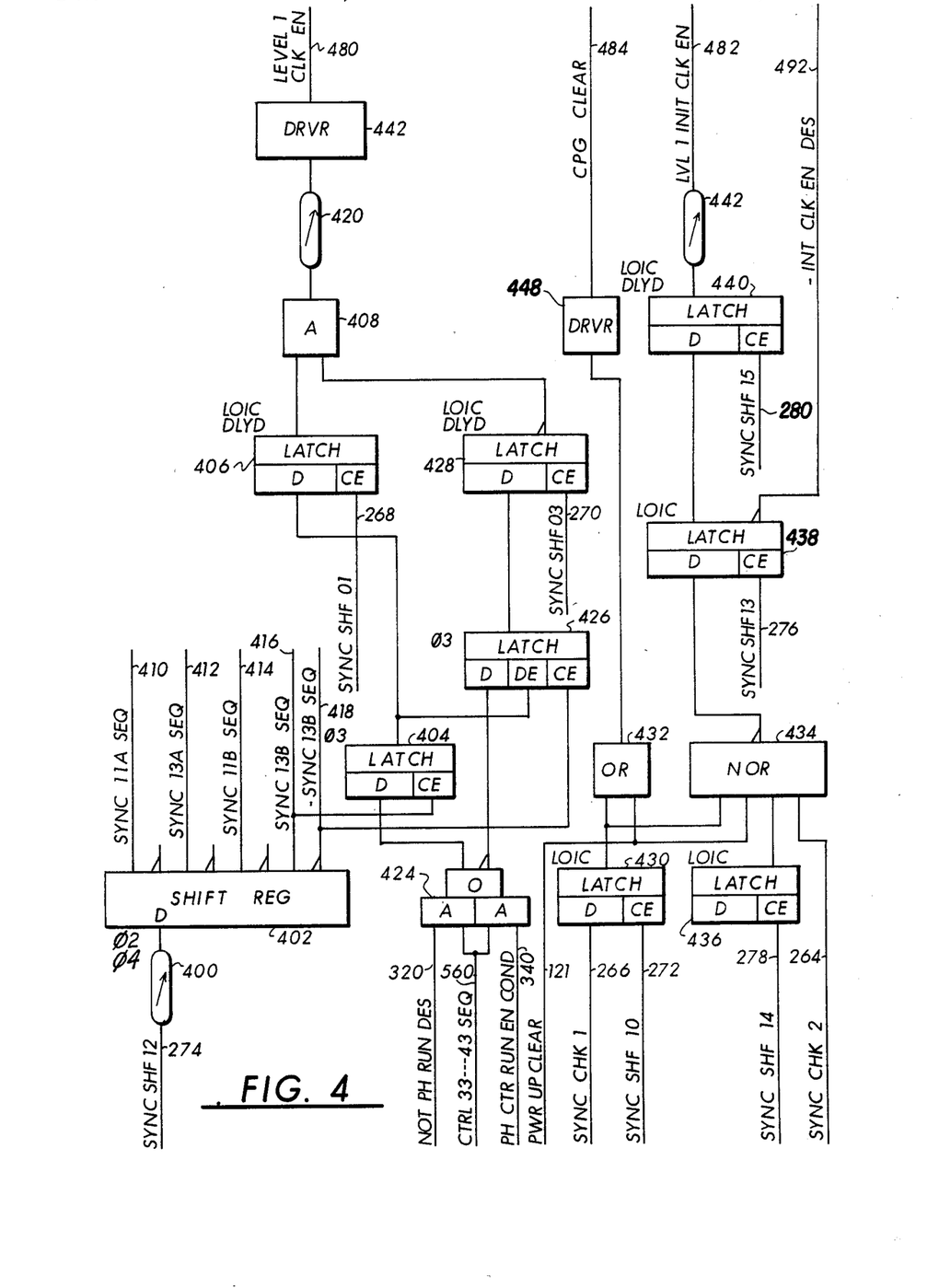

The signals on leads 282 and 284 are utilized to clock the inputs to certain latches shown in FIGS. 3-5. In this regard, the drawings have been simplified by not showing the clocking signals for latches. Instead, a legend appears at the upper left corner of each latch signifying when the latch is clocked. For example, in FIG. 5, the latch 510 is clocked by the Level 0 Internal Clock signal (L0IC) which is produced on lead 282.

Returning to FIG. 2, output of OR 208 is connected through an adjustable delay 238 to the clocking input of a 16-bit shift register 240 so that the register is shifted in response to each system clock pulse. The data entered into the first stage of the shift register is the system sync pulse derived from the selector 102. The system sync signal is applied to a receiver 242 having its output connected to one input of an OR 244. The output of OR 244 is connected through a delay 246 to a driver 248. The output of driver 248 is connected through an adjustable delay 252 to one input of an OR 254 and the output of OR 254 is connected through an adjustable delay 256 to the data input of shift register 240. Referring for the moment to FIG. 8, it is seen that the system sync signal occurs with every fourth system clock pulse. Therefore, the shift register 240 is shifted by each system clock pulse and a binary one is entered therein on every fourth shift.

Figures 9, 9C:
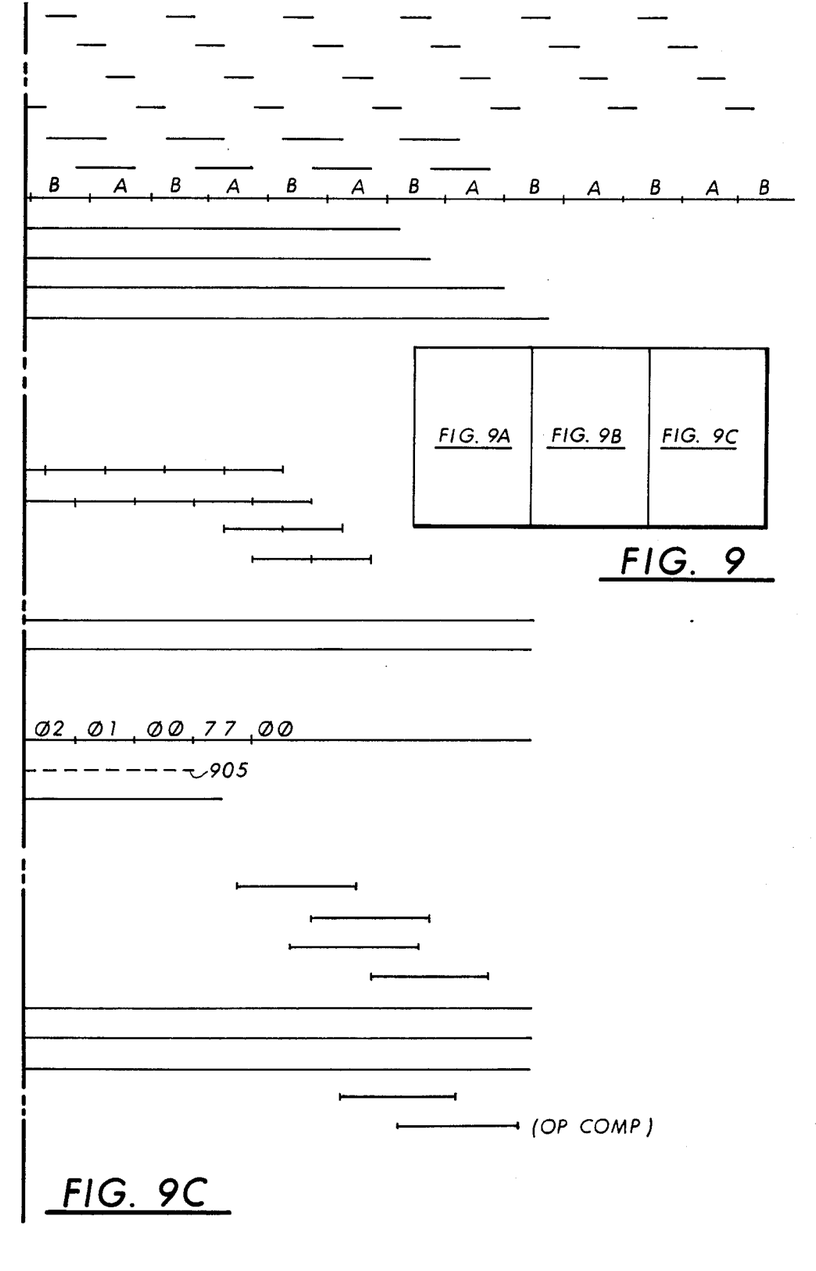
FIGS. 9A, 9B and 9C, when arranged as shown in FIG. 9, comprise a timing diagram illustrating the timing of certain signals produced by the logic circuits of FIGS. 2–5 during a rate change.
Figure 9A:
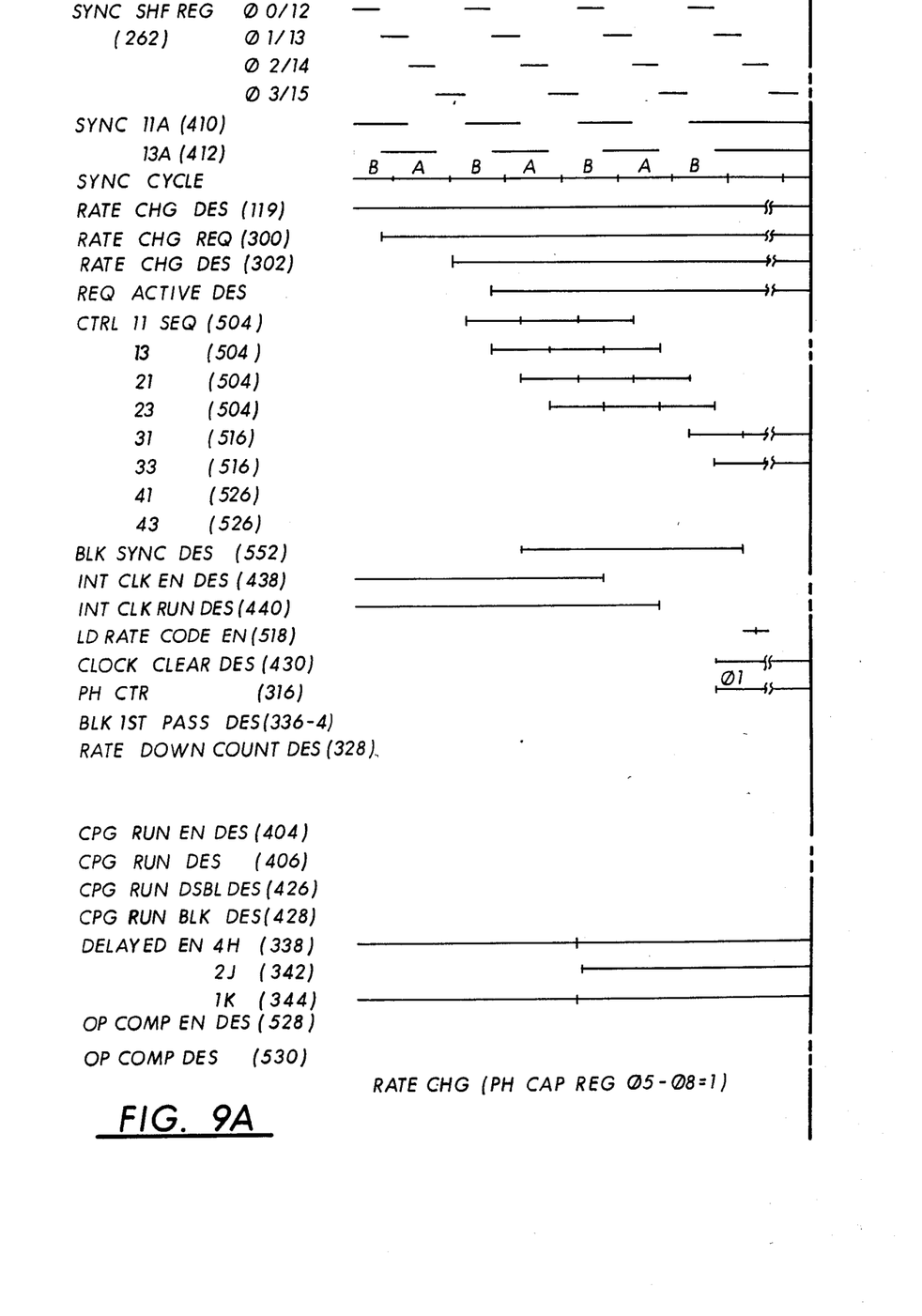
Figure 9B:
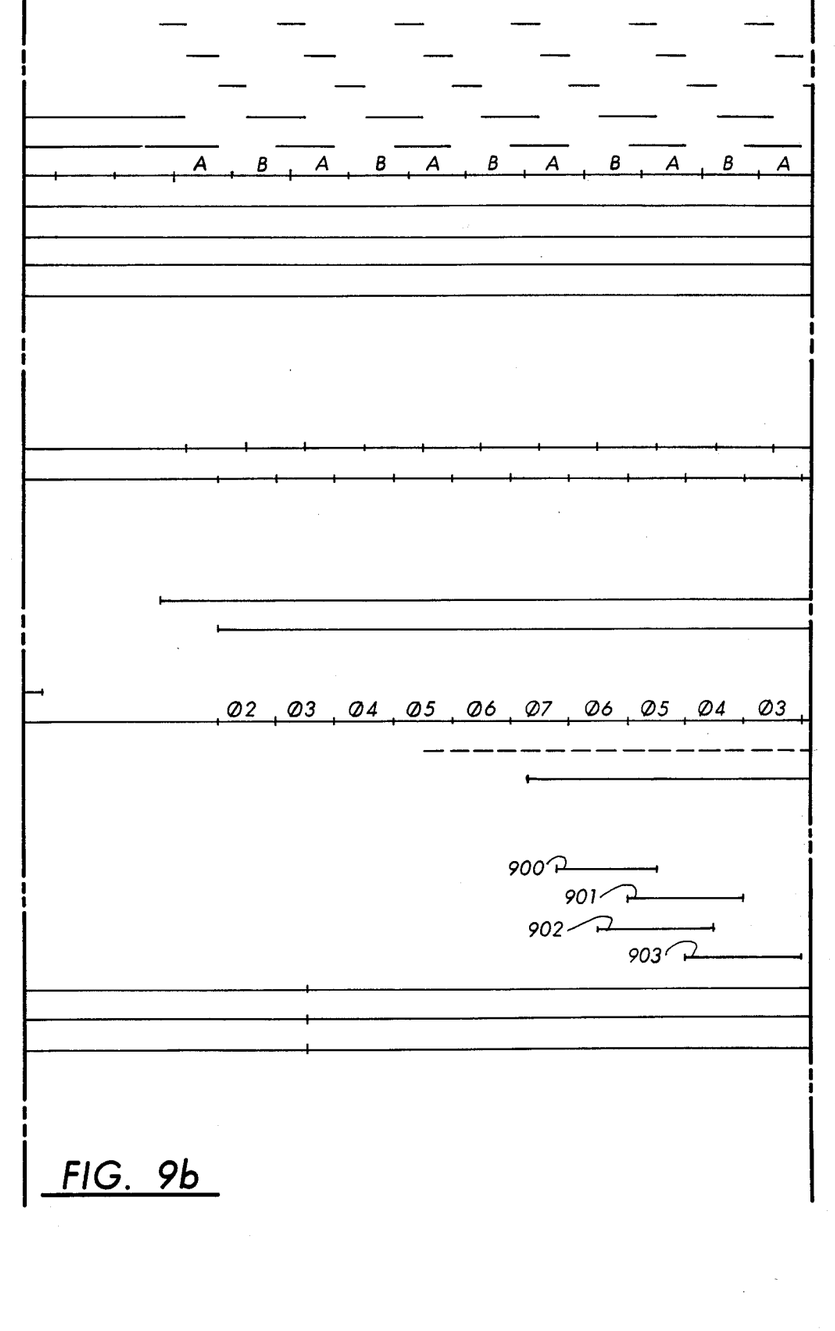

The output of shift register 240 is applied to two comparators 258 and 260 and a plurality of drivers 262. Comparator 258 compares the eight low-order bits of shift register 240 with the eight high-order bits and produces the output signal Sync Check 2 on lead 264 when there is an unequal condition. Comparator 260 compares bits 4-7 from shift register 240 with bits 8-11 and produces the output signal Sync Check 1 on lead 266 when there is an unequal condition. The Sync Check 2 signal is applied to a NOR 434 (FIG. 4) while the signal Sync Check 1 is applied to a latch 430. The drivers 262 produce the signals Sync Shift 01, 03, 10, 12, 13, 14, and 15 which are distributed to various logical elements shown in FIGS. 4 and 5. It will be understood that there are seven drivers 262, each connected to a corresponding one of stages 1, 3, 10, 12, 13, 14 and 15 of the shift register 240. Since the normal pattern of data in shift register 240 is a one followed by three zeros followed by another one and so on, it will be evident that the signals Sync Shift 01 and Sync Shift 03 will normally occur at the same time as the signals Sync Shift 13 and Sync Shift 15, respectively, once the shift register is completely filled. Thus, the timing diagram of FIGS. 9A and 9B represent these pairs of signals on one line.

Completing the description of FIG. 2, the receivers 210 and 290 serve as alternate inputs for the clock and sync signals and are utilized only on a slave clock fan-out board. In this case the receiver 210 receives the Mod B Clock signal from the output of driver 204 on the master clock fan-out board 120 while the receiver 290 receives the Mod B Oscillator Sync signal from the output of driver 248 on the master clock fan-out board.

The Sync Shift 12 signal produced on lead 274 is applied to FIG. 4 where it passes through an adjustable delay 400 and is applied to the data input of a four stage shift register 402. This register is clocked by phase 2 and phase 4 clocking signals from CPG 600 and as a Sync Shift 12 pulse is shifted through the register it successively generates the signals Sync 11A Sequence, Sync 13A Sequence, Sequence 11B Sequence and Sequence 13B Sequence. The Sync 11A and Sync 13A signals are generated at times corresponding to phase 2 and phase 4 of the A cycle of the ring counter in CPG 602 while the Sync 11B and 13B signals are generated at times corresponding to phase 2 and phase 4 of the B cycle of the ring counter in CPG 602. On the A cycle the CPG 602 outputs phase 1-4 pulses and on the B cycle it outputs phases 5-8.

In FIG. 4, the Sync Check 1 signal on lead 266 is false so latch 430 applies a false signal to OR 432 and NOR 434. The Power Up Clear signal on lead 121 is false as is the signal Sync Check 2 on lead 264. The output of latch 436 is also false. Under these conditions the outputs of OR 432 and NOR 434 are false.

The false output of OR 432 drives the output of driver 448 false so that the signal CPG Clear on lead 484 is false. This signal is applied to driver 724 (FIG. 7) and the false output of driver 724 is applied to the A Clear inputs of all CPGs. However, the false signal will not clear the CPGs.

The false output of NOR 434 sets latch 438 and the output of this latch sets latch 440. The output of latch 440 is passed through an adjustable delay 442 to become the signal Level 1 Internal Clock Enable on lead 482. This signal is applied to the A Enable input of CPG 600 so that the ring counter in the CPG is stepped by the Level 0 Clock pulses on leads $130_2$.

With the above-stated conditions the CPG 600 is enabled to output the phase 1-phase 4 signals for clocking the logic circuits of FIGS. 2-5.

The ring counters in all of the CPGs except CPG 600 are enabled by the output of driver 725 (FIG. 7) which is driven by driver 422 (FIG. 4). The output of driver 422 is true because the following conditions exist. In FIG. 4, the signals Not Phase Run Designator and Control 33 and -43 Sequence at the input to AND-OR 424 are true so that the output of the AND-OR sets latch 404 upon occurrence of each Sync 13B Sequence signal from shift register 402 and resets latch 426 at the end of each Sync 13B Sequence signal. The output of latch 404 sets latch 406 at the next following Sync Shift 01 time while the output of latch 426 resets latch 428 at Sync Shift 03 time. With latch 406 set and latch 428 reset, both inputs to AND 408 are enabled and it produces an output signal which is passed through delay adjust 420 and applied to driver 422 thereby driving the signal Level 1 Clock Enable true.

The signals for enabling the output latches for the CPGs (excluding CPG 600) are obtained from drivers 721-723 which are driven by the outputs of three drivers 338, 342 and 344. These drivers are connected to the outputs of three latches in a latch register 336. The latches are set by the outputs from a decode circuit 337 which responds to signals on leads 335 to set the three left-most latches 336 to a 101 state. This enables the drivers 338 and 344 and disables driver 342. When the outputs of these drivers are applied through drivers 721-723 to the Phase Enable inputs of the CPGs (except CPG 600) they enable the CPGs to produce all four or all eight phase pulses depending upon whether the Mode bit is tied low or tied high and the A Enable is active.

RATE CHANGE LOGIC - CHANGING THE CLOCK RATE

In FIG. 3, when the Clock Run signal on lead 117 goes low, bit 1 of the latches 300 is reset when the latches are clocked by phase 4 and a Sync 11A Sequence signal. The output of bit 1 of latch 300 is applied over lead 376 to bit 1 of latches 302 and through OR 312 to bit 3 of latches 302. Latches 302 are clocked a phase 4 time with a Sync 11B Sequence signal to reset bits 1 and 3. The output of bit 3 of latches 302 is applied to the bit 3 input of latches 300 so that it is reset the next time it is clocked. With bit 3 of latches 300 reset the signal on lead 384 enables one input of AND 310.

When bit 1 of latches 302 is reset it produces a false signal on lead 378 which is connected to the data input of a latch 304. Latch 304 is reset by the signal on lead 378 at the next phase 4 and Sync 11A Sequence time.

The output of latch 304 is applied to latch 306 and one input of an AND-OR 370. A second input of the AND-OR 370 is enabled at this time by the signal on lead 380 so AND-OR 370 produces the signal Enable Control 41 Sequence which is applied over lead 330 to an AND 524 (FIG. 5). During the clock run, a recirculating circuit including an OR 514, a two-stage shift register 516 and an AND 522 has been recirculating a one bit. The AND 524 has been blocked by the false signal on lead 330 so that the output form the right-most stage of shift register 516 has been blocked from entering the two-stage shift register 526. Therefore, the signal -Control 43 Sequence produced by the right-most stage of shift register 526 has been true thereby enabling AND 522.

When the signal on lead 330 goes true the AND 524 is enabled to pass the pulse circulating in shift register 516 into shift register 526. On the next shift, the pulse enters the right-most stage of shift register 526 and the signal -Control 43 Sequence goes false to block AND 522. The signal Control 33 AND -43 Sequence produced by AND 522 goes false and in FIG. 4 this signal completely blocks AND-OR 424.

With AND-OR 424 blocked latch 404 is reset at the beginning of the next Phase 3, Sync 13B Sequence time. The false output of latch 404 is latched into latch 406 at the next Sync Shift 01 time and the resulting output blocks AND 408. The false output from AND 408 passes through delay 420 and blocks the driver 422 so that the signal Level 1 Clock Enable goes false. This signal is applied to the driver 725 (FIG. 7) and the output of driver 725 stops the ring counters in all of the CPGs except CPG 600.

In FIG. 5, the signal Control 43 Sequence is applied to latch 528 which is set at phase 2 and -Sync 13B Sequence time. The output of latch 528 is applied to latch 530 and is latched therein during phase 2 when the signal Sync 13B Sequence goes false. The output of latch 530 is the signal Operation Complete which is applied over lead 562 to the control module 104 to signal that the clock run operation is complete.

It is essential that the Clock Run input signal to bit 1 of latches 300 go false before a rate change operation takes place and when this signal goes false it stops the counters in all CPGs except CPG 600 as described above.

After the Clock Run signal on lead 117 has gone false, a rate change may be initiated from the control module 104 by raising the Rate Change signal on lead 119. In FIG. 3, the Rate Change signal is entered into stage 2 of latches 300 upon occurrence of a phase 4 with a Sync 11A Sequence signal. The latch 300 outputs a signal over lead 385 to stage 2 of the latches 302 and the signal on lead 385 also passes through OR 312 to stage 3 of the latches 302. At phase 4 and Sync 11B Sequence time, stage 2 and 3 of the latches 302 are set. The stage 3 latch produces an output signal which passes through AND 314 because the signal on lead 384 is true. The signal on lead 382 is applied to stage 3 of the latches 300 at the next phase 4 and Sync 11A Sequence time and this latch produces an output signal to disable AND 314. Meanwhile, the pulse which passed through AND 314 is applied over lead 310 to OR 500 (FIG. 5) and passes through this OR and an AND 502 to a four-stage shift register 504.

In FIG. 3, when the signal on lead 385 is gated into stage 2 of the latches 302 the signal on lead 380 goes false to block one side of AND-OR 370. The signal on lead 383 goes true to enable the other side of AND-OR 370. Since the output of AND 318 is false at this time (counter 316 contains a zero count) the output of AND-OR 370 disables AND 524 (FIG. 5).

The true signal on lead 383 is applied to decode circuit 337, the count enable input of phase counter 316, and the data enable input of latch 510. Circuit 337 produces output signals to set stages 1 and 2 of latches 336 but since these latches are clocked by phase 2 and the output of an OR 334, the output of decoder 337 is not set into the latches at this time. The Clock Enable input of phase counter 316 is false at this time so the counter does not begin counting at this time.

Returning to FIG. 5, the output of AND 314 appearing on lead 310 is gated into shift register 504 at phase 2 and at phase 4 it is shifted into the second stage of the shift register. The output of the second stage is fed back to OR 500 so that a continuous string of ones will be entered into the shift register. The second stage of the shift register produces the signal Control 13 Sequence which is applied to one input of OR 508. The output of this OR is connected to the data input of latch 510. Stage 2 of latch 302 is connected to the data enable input of latch 510 by lead 383. Latch 510 is clocked by the Level 0 Internal Clock signal from lead 282 and the Sync Shift 14 signal on lead 278. The output of latch 510 is the signal Block Sync Designator which is applied over lead 552 to AND 244 (FIG. 2). The output of AND 244 is applied to the data input of the shift register 240 through adjustable delay 246, driver 240, adjustable delay 252, OR 254 and adjustable delay 256. The effect of the signal on lead 552 is to block the sync signal into the shift register 240. Therefore, on the first system sync after the signal on lead 552 goes true, an abnormal signal (a zero) is placed into the low order stage of the shift register 240. The comparison circuit 258 immediately detects that stages 0-7 of shift register 240 are not equal to stages 8-15. The compare circuit 258 produces the signal Sync Check 2 on lead 264 and this signal is applied to NOR 434 (FIG. 4). The output of the NOR goes false and at the next Sync Shift 13 time, the latch 438 is reset. When the latch is reset the signal -Internal Clock Enable Designator on lead 492 goes true and this signal is applied to AND 518 but the AND is blocked at this time because the signal Control 31 Sequence is false.

The output of latch 438 is also connected to the data input of latch 440 which is clocked by the Level 0 Internal Clock Delayed and Sync Shift 15 signals. Therefore, at Sync Shift 15 time latch 440 is reset and its output goes false. This signal passes through adjustable delay 442 and over the lead 482 to the A Enable input of the CPG 600. This disables the ring counter in the CPG 600. However, at phase 4 before the CPG 600 is stopped, it advances the phase counter to a count of 1 because the counter is enabled by the signal Control 31 Sequence as subsequently described.

At the time the Block Sync Designator latch 510 is set the shift register 504 is right shifted but no control signal is produced by stage 4. Stage 2 continues producing an output signal through OR 508 so latch 510 is set for another cycle. Two phases later shift register 504 is again right shifted so that it is now filled with ones.

Stage 4 produces the signal Control 23 Sequence which is applied over lead 550 and through OR 334 (FIG. 3) to the clock enable input of latches 336. This gates the output of decode circuit 337 (HHH) into the first three positions of the latches and the outputs of the latches drive all the output signals from drivers 338, 342 and 344 true. The output signals from these drivers pass through drivers 721-723 to the Phase Enable inputs of all CPGs except CPG 600. With all Phase Enable inputs high, the CPG outputs are blocked so that no phase pulses are issued. However, the phase capture register 372 retains a "snapshot" of the last phase issued by CPG 602 for later use.

Meanwhile, in FIG. 5 the right shifting of shift register 504 continues at each phase 2 and phase 4 but 0's are entered into stage 1. When stage 4 of shift register 505 is set its output is fed through AND 506 to block AND 502 so that zero signals are shifted into the left-most stages while the ones in the shift register are shifted to the right. When there is a zero in the second stage and a one in the fourth stage, the output signals from these stages enable AND 512 and it produces an output signal through OR 514 to set the first stage of shift register 516. This shift register is clocked by phase 2 and phase 4 signals. The output of the first stage of shift register 516 is the signal Control 31 Sequence. It is applied to AND 518 and since the signal on lead 492 is true, an output is produced through AND 518 at the next following Sync Shift 14 time. The output of AND 518 is applied to the clock enable input of a latch 520. This latch receives the rate bit code on leads 116 and 118 from the control module 104. These bits are clocked into the latch and the latch produces the signals Mod A Rate Select Bit 0 and Mod A Rate Select Bit 1 on leads 554 and 556. These signals are applied to the selector 102 to select the source of the new clock pulse rate. The new system clock and system sync signals are applied to receivers 200 and 242.

Returning to FIG. 2, on the fourth system clock pulse after compare circuit 258 recognizes an inequality between stages 0-7 and 8-15 of shift register 240, the compare circuit 260 recognizes a difference between stages 4-7 and 8-11. The compare circuit 260 produces the output signal Sync Check 1 which is applied to the data input of latch 430. This latch is clocked by the Level 0 Internal Clock signal and the Sync Shift 10 signal. When the latch is set it produces an output signal that passes through OR 432 and driver 448 to become the signal CPG Clear on lead 484. This signal is applied to driver 724 whose output clears the ring counters and latches of all of the clock pulse generators.

The signal Control 31 Sequence is also applied to the Count Enable input of a phase counter 316. The purpose of this phase counter is to insure that the CPGs are restarted at the phase of the new frequency following the last phase of the old frequency. The counter is advanced at each phase 4 of CPG 600.

On the third shift after stage 4 of shift register 504 is set, a zero is entered into stage 4. This blocks OR 518 and applies a reset signal to latch 510 to terminate the "false sync" pulses being fed into shift register 240. System clock pulses continue shifting the contents of shift register 240 until stage 4-7 are equal to stages 8-11. Comparator 260 detects the equality and the signal Sync Check 1 goes false. In FIG. 4, this signal resets latch 430 at Sync Shift 10 time and the false output of the latch acts through OR 432, driver 448 and driver 724 to drive the A Clear input of all CPGs false.

Four clock pulses after the output of comparator 260 goes false, the output lead 264 of comparator 258 goes false. In FIG. 4, this disables one input of NOR 434 and since the other inputs of the NOR are false it produces an output signal to set latch 438. The output from latch 438 then sets latch 440 so that the signal Level 1 Internal Clock Enable goes true to again enable the ring counter in CPG 600 to run.

Returning again to FIG. 5, the 1 bit entered into shift register 516 is right-shifted into the second stage of the register and an output signal is produced on lead 517 to enable one input of AND 522. The last stage of shift register 526 is not set, hence the AND 522 is enabled and its output is fed back to OR 514 so that ones are continuously entered into the first stage of shift register 516 thereby continuing the signal Control 31 Sequence. The output of AND 522 is the signal Control 33 and -43 Sequence which is applied to both sides of AND-OR 424. The other inputs of the AND-OR are not conditioned at this time.

Returning to FIG. 3, the phase counter 316 is a seven stage counter capable of counting up or down, the count being changed at phase 4 of each cycle of the clock pulse generator 600. The counter counts up until it contains a count of three. At this time the outputs from stages 5, 6 and 7 enable AND 324 and it produces an output signal through OR 334 to enable latches 336.

When the ring counter in CPG 600 is restarted it begins advancing phase counter 316 at each phase 4. The three low order stages (5-7) of the counter are connected to three ANDs 318, 326 and 324 and stage 4 is connected to a further input of AND 318. The arrangement is such that AND 318 is enabled when the count in the counter is 17 (octal), AND 326 is enabled when the count is 7, and AND 324 is enabled when the count is 3.

The AND 318 was disabled prior to the time CPG 600 was stopped when the phase counter was incremented to a count of one. At this time the output of AND 318 disabled AND-OR 370 and the output of the AND-OR disabled AND 524. Therefore, when the ring counter in CPG 600 is restarted it again begins shifting register 516 (FIG. 5) but the output of shift register 516 is blocked by AND 524 and cannot enter shift register 526. The pulses in shift register 516 are recirculated through AND 522, OR 514 and the shift register 516.

Returning to FIG. 3, the phase capture register 372 is still holding the snapshot of the last phase signal issued by CPG 602 at the time it was stopped. The four stages of the phase capture register holding the snapshot of phases 5-8 are applied to an OR 374 and the output of OR 374 enables one input of an AND 322.

Assume first that CPG 602 was outputting one of phases 5-8 at the time it was stopped. In this case OR 374 enables one input to AND 322. On each phase 4 the phase counter is incremented and nothing happens until it reaches a count of three. At this time all inputs to ANDs 324 and 322 are enabled. The low level output of AND 322 is applied to the fourth stage of latches 336. With all inputs enabled AND 324 produces an output signal which passes through OR 334 to the clock enable input of latches 336. At the next phase 2 stages 1-3 of the latches are set and stage 4 is reset. The outputs from stages 1-3 are passed through drivers 338, 342 and 344, respectively, to drive drivers 721, 722 and 723, respectively. The outputs from drivers 721-723 block any phase output signals from all CPGs except CPG 600.

The output from the fourth stage of latches 336 is applied to AND-OR 332 and enables one input of the AND-OR.

The phase counter 316 is incremented at each phase 4 until it reaches a count of 7. At this time the outputs of counter 316 enable all inputs to AND 326 and it produces an output signal which is applied to AND-OR 332. The right side of AND-OR 332 is enabled at this time by the output of the fourth stage of latches 336 so the signal from AND 326 passes through AND-OR 332 and the AND-OR 424 (FIG. 4) to the data inputs of latches 404 and 426. Latch 404 is set by Sync 13B Sequence and latch 426 is reset by -Sync 13B Sequence. At the next Sync Shift 01 time latch 406 is set and at Sync Shift 03 time latch 428 is reset. The resulting outputs from latches 406 and 428 enables AND 408. The AND output passes through delay 420 and driver 422 to generate the signal Level 1 Clock Enable. As previously described, this signal is applied through driver 725 to the A Enable inputs of all CPGs except CPG 600 to enable the ring counters in the CPGs to run.

Returning to FIG. 3, the true output of AND 326 clocks latch 328. Since the counter stages 4-7 contain a count of 7 its output 4 is false and this false signal sets the latch at phase 2 when the output of AND 326 is true.

The output of latch 328 is connected to the count direction control of phase counter 316 and when the latch is set it causes the counter to count down. Therefore, the counter is counted down until it reaches a count of 3 at which time AND 324 is again enabled. This again causes latches 336 to output signals to block phase outputs from all CPGs except CPG 600. Bit 4 of latches 336 is again set so that it continues to block one input of AND-OR 332.

When the counter 316 (stages 4-7) has been decremented to 17 (octal) it enables all inputs to AND 318 and an output signal is applied to AND-OR 370. The signal on lead 383 is still true so the output signal from AND 318 passes through AND-OR 370 and enables AND 524 (FIG. 5). One bits have been recirculating through shift register 516 so on the first shift after AND 524 is enabled, the first stage of the shift register 526 is set. On the following shift the second stage of shift register 526 is set and the signal Control 43 Sequence goes true.

Meanwhile, counter 316, stages 5-7, enable AND 326 and produce an output signal to clock latch 328. Since stage 4 of counter 316 contains a one, latch 328 is reset and its output causes counter 316 to begin counting up again. However, it is stopped at zero because the signal -Control 43 Sequence has blocked AND 522 and at the next shift of shift register 516 the signal Control 31 Sequence goes false to block counter 316.

The Control 43 Sequence signal is clocked into latch 528 at -Sync 13B Sequence time and the output of this latch is clocked into latch 530 by the Sync 13B Sequence signal. When latch 530 is set it produces the signal Operation Complete on lead 562 and this signal is sent back to control module 104 to indicate that the rate change operation has been completed.

Consider now the case where the CPG 602 last outputs a phase 1, 2, 3 or 4 signal before it is stopped. In this case the output of the phase capture register blocks OR 374 which in turn blocks AND 322. The phase counter 316 is counted up and then down as previously described. However, since the output of AND 322 is high, the fourth bit of latches 336 is set each time the phase counter reaches the count of three. This blocks the right input to AND-OR 332 so that when the phase counter 316 reaches a count of 7 to enable AND 326, the output of the AND is blocked and cannot reach AND-OR 424 (FIG. 4). Referring to the timing diagram of FIGS. 9A-9C, this has the effect of eliminating the signals produced by latches 404, 406, 426 and 428 which are identified in FIGS. 9A-9C by the reference numerals 900, 901,902 and 903. This in turn causes a delay in raising the Level 1 Clock Enable on lead 480 so that all CPGs except CPG 600 are, in effect, started later. Therefore, instead of the ring counters in the CPGs (except CPG 600) being at, for example, phase 5 when the rate change operation is completed, they are at phase 1.

The outputs from the CPGs are not enabled until the rate change signal on lead 119 is terminated and the clock run signal on lead 117 is generated. At this time the settings of latches 300 are changed followed by a change in the settings of latches 302. This disables the input to decoder 337 over lead 382 and enables the decoder to again output the signals HLH. During the initial portion of the clock run procedure, at Control 23 Sequence time, the output of OR 334 clocks the output of decoder 337 into latches 336 and, as previously described, the outputs from the latches control the Phase Enable inputs of all CPGs except CPG 600 so that the CPGs ar enabled to again output the phase signals.

While a preferred embodiment of the invention has been described in specific detail, it will be understood that various modifications and substitutions may be made in the preferred embodiment without departing from the spirit and scope of the invention as defined by the appended claims.

The embodiments of the invention in which an exclusive property or privilege is claimed are defined as follows:

1. In a system having a plurality of sources of system clock signals and a plurality of clock pulse generators responsive to said system clock signals for producing clock phase signals, a circuit for controlling said clock pulse generators when a change is made from one of said sources of system clock signals to another, said circuit comprising:
   selector means for applying system clock signals from one of said sources to said clock pulse generators;
   means for generating a rate change signal and a code identifying a second of said sources as a new source of system clock signals to be applied to said clock pulse generators;
   means responsive to said rate change code for stopping said clock pulse generators;
   phase capture means for storing an indication of the phase output of one of said clock pulse generators at the time said clock pulse generators are stopped;
   further means responsive to said rate change signal and said rate change code for controlling said selector means to select said second source of system clock signals while said clock pulse generators are stopped; and
   means responsive to said phase capture means for restarting said clock pulse generators at a first time or a second time,
   whereby a change may be made from one of said sources of system clock signals to another without glitches or shortened phase signals being produced by said clock pulse generators.

2. A circuit as claimed in claim 1 wherein each clock pulse generator includes an n stage counter for producing n signals and gating means for gating said n signals to 2n output terminals of the clock pulse generator whereby 2n signals of different phases are produced by a clock pulse generator over two successive cycles of the n stage counter.

3. A circuit as claimed in claim 2 wherein said means responsive to said phase capture means restarts said clock pulse generators at said first time if said phase capture means is storing an indication of phase $n+1$ through phase $2n$ and restarts said clock pulse generators at said second time, later than said first time, if said phase capture means is storing an indication of phase 1 through phase n.

4. A circuit as claimed in claim 3 where $n=3$.

* * * * *